(12) United States Patent
Fricke et al.

(10) Patent No.: US 8,927,614 B2
(45) Date of Patent: *Jan. 6, 2015

(54) PROCESS FOR PRODUCING RIGID POLYURETHANE FOAMS

(75) Inventors: Marc Fricke, Osnabrück (DE); Markus Schütte, Osnabrück (DE); Sirus Zarbakhsh, Hong Kong (HK); Johann Klassen, Stemwede-Oppendorf (DE)

(73) Assignee: BASF SE, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/092,567

(22) Filed: Apr. 22, 2011

(65) Prior Publication Data

US 2011/0263737 A1 Oct. 27, 2011

Related U.S. Application Data

(60) Provisional application No. 61/327,741, filed on Apr. 26, 2010.

(51) Int. Cl.
| | | |
|---|---|---|
| *C08G 18/00* | (2006.01) | |
| *C08G 18/48* | (2006.01) | |
| *C08G 18/66* | (2006.01) | |
| *C08J 9/14* | (2006.01) | |
| *C08G 18/18* | (2006.01) | |
| *C08G 18/50* | (2006.01) | |
| *C08G 101/00* | (2006.01) | |

(52) U.S. Cl.
CPC .......... *C08G 18/4879* (2013.01); *C08G 18/482* (2013.01); *C08J 2375/08* (2013.01); *C08G 18/6674* (2013.01); *C08J 9/141* (2013.01); *C08G 18/1825* (2013.01); *C08G 2101/0025* (2013.01); *C08G 2101/005* (2013.01); *C08G 8/4845* (2013.01); *C08G 18/5027* (2013.01)
USPC ........... 521/174; 521/137; 521/155; 521/156; 521/157; 521/158; 521/159; 521/160; 521/170; 521/172; 528/78; 528/79

(58) Field of Classification Search
CPC ........... C08G 18/1825; C08G 81/4879; C08G 18/485; C08G 18/4845; C08G 18/14
USPC ......... 521/137, 155, 156, 157, 158, 159, 160, 521/170, 172, 174; 528/78, 79
See application file for complete search history.

(56) References Cited

U.S. PATENT DOCUMENTS

| | | | |
|---|---|---|---|
| 4,209,609 A | 6/1980 | Haas | |
| 4,391,728 A | 7/1983 | Korczak et al. | |
| 4,562,290 A | 12/1985 | Korczak et al. | |
| 5,141,968 A * | 8/1992 | Dietrich et al. | 521/167 |
| 6,339,110 B1 * | 1/2002 | Cappella et al. | 521/131 |
| 2005/0004403 A1* | 1/2005 | Guttes et al. | 568/679 |
| 2006/0142407 A1* | 6/2006 | Hollmann et al. | 521/172 |
| 2007/0199976 A1* | 8/2007 | Huang et al. | 228/56.3 |

FOREIGN PATENT DOCUMENTS

| | | | | |
|---|---|---|---|---|
| DE | 37 40 634 A1 | 6/1989 | | |
| DE | 42 32 970 A1 | 4/1994 | | |
| EP | 0 318 784 B1 | 6/1989 | | |
| EP | 0 421 269 A2 | 4/1991 | | |
| WO | WO 95/02620 | 1/1995 | | |
| WO | WO-9947581 | * 9/1999 | | C08G 65/26 |
| WO | WO 2009/048826 A2 | 4/2009 | | |

OTHER PUBLICATIONS

U.S. Appl. No. 13/410,616, filed Mar. 2, 2012, Schuette, et al.
U.S. Appl. No. 13/422,702, filed Mar. 16, 2012, Fricke, et al.
U.S. Appl. No. 13/561,196, filed Jul. 30, 2012, Giesker, et al.
U.S. Appl. No. 13/590,353, filed Aug. 21, 2012, Emge, et al.
U.S. Appl. No. 13/590,571, filed Aug. 21, 2012, Emge, et al.
U.S. Appl. No. 13/813,300, filed Jan. 30, 2013, Loeffler, et al.

* cited by examiner

*Primary Examiner* — Michael L Leonard
(74) *Attorney, Agent, or Firm* — Oblon, Spivak, McClelland, Maier & Neustadt, L.L.P.

(57) ABSTRACT

The invention relates to a process for producing polyurethanes by reacting
a) polyisocyanates with
b) compounds having at least two hydrogen atoms which are reactive toward isocyanate groups,
wherein the compounds b) having at least two hydrogen atoms which are reactive toward isocyanate groups comprise at least one polyether alcohol b1) which has been prepared by reaction of an aromatic amine b1a) with propylene oxide using an amine b1b) which is different from b1a) as catalyst.

18 Claims, No Drawings

PROCESS FOR PRODUCING RIGID POLYURETHANE FOAMS

The invention relates to a process for producing rigid polyurethane foams by reacting polyisocyanates with compounds having at least two hydrogen atoms which are reactive toward isocyanate groups in the presence of blowing agents.

Rigid polyurethane foams have been known for a long time and are used predominantly for heat and cold insulation, e.g. in refrigeration appliances, in hot water storages, in district heating pipes or in building and construction, for example in sandwich elements. A summary overview of the production and use of rigid foams based on isocyanate may be found, for example, in Kunststoff-Handbuch, volume 7, Polyurethane, 1st edition 1966, edited by Dr. R. Vieweg and Dr. A. Höchtlen, and 2nd edition 1983, edited by Dr. Günter Oertel, and 3rd edition 1993, edited by Dr. Günter Oertel, Carl Hanser Verlag, Munich, Vienna.

In the past, mostly fluorochloroalkanes (CFCs), preferably trichlorofluoromethane, were used as blowing agents for producing rigid polyurethane foams. However, a disadvantage of these blowing gases is pollution of the environment.

As successors to CFCs, use is now mostly made of hydrocarbons, preferably pentanes. Thus, EP-A-421 269 describes the use of cyclopentane and/or cyclohexane, if appropriate in admixture with other hydrocarbons, as blowing agents.

However, these blowing agents differ in various ways from the halogenated blowing agents. Thus, they have poorer compatibility with the other constituents of the polyurethane systems. This leads to rapid demixing of the components comprising blowing agent.

A further important criterion for the processing of rigid polyurethane foams is the viscosity of the liquid starting materials. This has a direct influence on the flow behavior of the starting components. In addition, very highly viscous components are difficult to pump.

For the present purposes, the flowability of the foam is the flow behavior of the reacting mixture of polyisocyanate and the compound having at least two hydrogen atoms which are reactive toward isocyanate groups. The flowability is usually determined by determining the path length which is covered by a defined amount of the reacting mixture. This can be done by introducing the reaction mixture into a flexible hose of plastic film, hereinafter referred to as hose test, or into a standardized elongated mold, for example a Bosch lance, and the length of the molding formed in this way is determined. The flowability plays an important role in the filling of hollow spaces with foam, as occurs, in particular, in the production of refrigeration appliances.

A frequently used starting component for the production of rigid polyurethane foams is polyether alcohols which are prepared by addition of alkylene oxides onto aromatic amines. These polyether alcohols reduce the thermal conductivity of the foams and can improve the compatibility with the blowing agents. As aromatic amines, preference is given to using methylenedianiline (MDA), which is usually present in admixture with condensation products thereof having more than two rings (PMDA), and toluenediamine (TDA). In the case of TDA, the ortho isomers, frequently also referred to as vicinal TDA, have the greatest industrial importance.

The polyether alcohols prepared using aromatic amines frequently have a very high viscosity.

To overcome this disadvantage and to keep the viscosities of such polyols low, it is therefore customary to choose not too high a hydroxyl number for such polyols. The hydroxyl numbers of the polyols are preferably less than 400 mg KOH/g.

A further possible way of reducing the viscosity is the concomitant use of ethylene oxide for building up the polyether chain. The hydroxyl number of the polyols can be increased in this way.

U.S. Pat. No. 4,209,609 describes the preparation of TDA polyols in the hydroxyl number range of 400-630 mg KOH/g which are prepared by reacting TDA firstly with about 4 mol of ethylene oxide and subsequently with propylene oxide. These TDA polyols display some advantages (e.g. low coefficient of thermal conductivity). Further production processes are described in DE 4232970 A1 and U.S. Pat. No. 4,562,290. The amine-catalyzed preparation of TDA polyols, in which firstly from 2 to 5 mol of ethylene oxide and then propylene oxide are introduced, is described in EP 0318784 B1 and DE 3740634.

EP 0318784 B1 and DE 3740634 describe the preparation of polyols based on TDA, in which firstly 2-5 mol of ethylene oxide and then propylene oxide are added onto the TDA, with amines being used as catalysts.

Although the ethylene oxide in the chain reduces the viscosity of the polyether alcohols, the compatibility with the hydrocarbons used as blowing agent is adversely affected. In addition, the ethylene oxide in the chain leads to an increase in the hydrophilicity.

U.S. Pat. No. 4,391,728 describes the preparation of low-viscosity TDA polyols by means of KOH catalysis at temperatures above 140° C. Exclusively propylene oxide is used as alkylene oxide. At least 0.8% by weight of alkali metal hydroxide as catalyst is necessary for the reaction. The use of such large amounts of alkali metal hydroxides as catalyst makes a complicated work-up necessary. In addition, the large amount of catalyst can result in not all hydrogen atoms of the TDA reacting, which can lead to problems in the production of the foams.

It was an object of the present invention to provide a process for producing rigid polyurethane foams using polyols based on aromatic amines, in particular TDA, which have good compatibility with the hydrocarbons used as blowing agent, a low viscosity of the liquid starting components and good processing and foaming properties.

The object has surprisingly been achieved by the use of polyether alcohols which are based on aromatic amines and have been prepared by addition of propylene oxide onto aromatic amines using amines as catalysts.

The invention accordingly provides a process for producing polyurethanes, preferably polyurethane foams, in particular rigid polyurethane foams, by reacting a) polyisocyanates with b) compounds having at least two hydrogen atoms which are reactive toward isocyanate groups, wherein the compounds b) having at least two hydrogen atoms which are reactive toward isocyanate groups comprise at least one polyether alcohol b1) which has been prepared by reaction of an aromatic amine b1a) with propylene oxide using an amine b1b) which is different from b1a) as catalyst.

As aromatic amines b1a) in the preparation of the polyether alcohols b1), it is in principle possible to use all known aromatic amines having at least one, preferably at least two and particularly preferably two amino groups. The amino groups are usually primary amino groups.

In a preferred embodiment of the process of the invention, the aromatic amines b1a) are selected from the group consisting of aniline, TDA, MDA and PMDA, particularly preferably from the group consisting of TDA and PMDA. In particular, TDA is used.

When TDA is used, it is possible to use all isomers either alone or in any mixtures with one another. In particular, it is possible to use 2,4-TDA, 2,6-TDA, mixtures of 2,4-TDA and 2,6-TDA, 2,3-TDA, 3,4-TDA, mixtures of 3,4-TDA and 2,3-TDA and also mixtures of all isomers mentioned.

2,3-TDA and 3,4-TDA are frequently also referred to as ortho-TDA or vicinal TDA. The TDA can be exclusively vicinal TDA. In a particularly preferred embodiment of the process of the invention, the TDA comprises at least 90% by weight, particularly preferably at least 95% by weight and in particular at least 99% by weight, in each case based on the weight of the TDA, of vicinal TDA.

As alkylene oxide, preference is given to use exclusively propylene oxide. For individual applications, it can be advantageous to use a small amount of ethylene oxide in addition. To avoid the disadvantages indicated above, the proportion of ethylene oxide should not exceed 10% by weight. The content of ethylene oxide is, in this embodiment, preferably in the range from greater than zero to 10% by weight, particularly preferably from greater than zero to 5% by weight and in particular from greater than zero to 2% by weight, in each case on the weight of the alkylene oxides b).

As catalysts for preparing the polyether alcohols b1), use is made of, as described, of amines b1b). It goes without saying that the amines b1b) used as catalysts are not the above-described aromatic amines b1a) used as starter substance. In the following, the term starter substance refers to the compounds which have hydrogen atoms which are reactive toward alkylene oxides.

For the purposes of the present invention, amines b1b) are all substitution products of ammonia in which at least one hydrogen atom has been replaced by alkyl and/or aryl radicals.

In an embodiment of the invention, the amines b1b) are aliphatic amines. The aliphatic amines can comprise primary, secondary or tertiary amino groups. Among aliphatic amines, particular preference is given to tertiary amines such as trialkylamines or dimethylalkylamines. Amino alcohols also count as amines.

In a further embodiment of the invention, the amine b1b) is an aromatic amine different from b1a), for example dimethylaniline.

In an embodiment of the process of the invention, the amines b1b) can be aromatic heterocyclic compounds having at least one nitrogen atom, preferably at least two nitrogen atoms, in the ring.

The amines b1b) used as catalyst are preferably selected from the group consisting of trimethylamine, triethylamine, tripropylamine, tributylamine, N,N'-dimethylethanolamine, N,N'-dimethylcyclohexylamine, dimethylethylamine, dimethylbutylamine, N,N'-dimethylaniline, 4-dimethylaminopyridine, N,N'-dimethylbenzylamine, pyridine, imidazole, N-methylimidazole, 2-methylimidazole, 4-methylimidazole, 5-methylimidazole, 2-ethyl-4-methylimidazole, 2,4-dimethylimidazole, 1-hydroxypropylimidazole, 2,4,5-trimethylimidazole, 2-ethylimidazole, 2-ethyl-4-methylimidazole, N-phenylimidazole, 2-phenylimidazole, 4-phenylimidazole, guanidine, alkylated guanidines, 1,1,3,3-tetramethylguanidine, 7-methyl-1,5,7-triazabicyclo[4.4.0]dec-5-ene, 1,5-diazobicyclo[4.3.0]-non-5-ene, 1,5-diazabicyclo[5.4.0]undec-7-ene.

The amines b1 b) can be used either alone or in any mixtures with one another.

In a preferred embodiment of the invention, the catalyst b1b) is dimethylethanolamine.

In a preferred embodiment of the invention, the catalyst b1b) is an imidazole, particularly preferably imidazole.

The amine b1b) is preferably used in an amount of 0.1-1.0% by mass, based on the weight of all starting components for the preparation of the polyether alcohol b1). This amount is particularly preferred when aliphatic amines are used.

The heterocyclic compounds, in particular the imidazoles, are preferably used in an amount of from 0.01 to 0.5% by mass based on the weight of all starting components for the preparation of the polyether alcohol.

The amines b1b) used as catalyst for preparing the polyether alcohols b1) can be added at the beginning of the reaction. The catalyst b1b) can be added before the addition of the alkylene oxides or, less preferably, simultaneously with the commencement of introduction of the alkylene oxides.

In a particularly preferred embodiment of the invention, it is possible for the addition reaction of the alkylene oxides to proceed in the absence of a catalyst at the beginning of the reaction and for the catalyst to be added during the reaction. In this embodiment, the addition of the catalyst preferably takes place after introduction of up to 3.4 mol of propylene oxide per mol of aromatic amine a), particularly preferably up to 3.0 mol of propylene oxide per mol of aromatic amine b1a).

The reaction of the amines with the alkylene oxide is carried out by customary processes which are described, for example, in EP 318 784. As described, the catalyst b1b) can be added before the reaction, simultaneously with the commencement of introduction of the alkylene oxides or during the reaction. The starter mixture can be stripped, for example at a pressure of 0.01-1 bar and a temperature of 25-150° C., before introduction of the alkylene oxides.

The aromatic amines b1a) used as starter substance can, in a preferred embodiment of the invention, be used as sole starter substance.

In a further embodiment of the invention, the aromatic amines b1a) can be used in combination with other compounds b1c) having at least two hydrogen atoms which are reactive toward isocyanate groups. The compounds b1c) are preferably alcohols or amino alcohols different from b1b) and having a molecular weight of 40-400 g/mol, in particular 60-120 g/mol, and from 1 to 8, preferably 2 or 3, hydroxyl groups. The compounds b1c) will hereinafter also be referred to as costarters.

The compound b1c) is preferably selected from the group consisting of water, ethylene glycol, diethylene glycol, propylene glycol, dipropylene glycol, glycerol and triethanolamine. The compounds mentioned can also be used in the form of their reaction products with alkylene oxides having a molecular weight of up to 800 g/mol.

The compounds of b1c) are preferably used in an amount of from 0.1 to 20% by weight, based on the weight of the starter compounds.

The addition reaction of the alkylene oxides is preferably carried out at a temperature in the range from 90 to 150° C. and a pressure of from 0.1 to 8 bar. The introduction of the alkylene oxides is usually followed by an after-reaction phase to achieve very complete reaction of the alkylene oxides. The crude polyether alcohol obtained in this way is freed of unreacted alkylene oxide and volatile compounds by distillation, preferably under reduced pressure.

The polyether alcohols prepared by the process of the invention preferably have a hydroxyl number in the range from 200 to 800 mg KOH/g, particularly preferably from 350 to 500 mg KOH/g and in particular from 350 to 450 mg KOH/g.

Owing to their low viscosity, the polyurethane systems produced using the polyether alcohols b1) have good processability, in particular a good flowability.

They are readily compatible with blowing agents, in particular blowing agents based on hydrocarbons, and have a good storage stability. The compatibility with the isocyanate component is also increased. The demolding time for the foams was surprisingly also shorter.

The reaction of the amines, in particular TDA, with the alkylene oxides is quantitative and virtually no free amine is present in the polyether alcohols b1).

As regards the starting materials used for the process of the invention, the following details may be provided:

Possible organic polyisocyanates a) are preferably aromatic polyfunctional isocyanates.

Specific examples are: tolylene 2,4- and 2,6-diisocyanate (TDI) and the corresponding isomer mixtures, diphenylmethane 4,4'-, 2,4'- and 2,2'-diisocyanate (MDI) and the corresponding isomer mixtures, mixtures of diphenylmethane 4,4'- and 2,4'-diisocyanates and, in the production of rigid polyurethane foams, in particular mixtures of diphenylmethane 4,4'-, 2,4'- and 2,2'-diisocyanates and polyphenylpolymethylene polyisocyanates (crude MDI).

The polyether alcohols b1) are usually used in admixture with other compounds having at least two hydrogen atoms which are reactive toward isocyanate groups.

As compounds which have at least two hydrogen atoms which are reactive toward isocyanate and can be used together with the polyether alcohols bi) used according to the invention, use is made of, in particular, polyether alcohols and/or polyester alcohols having OH numbers in the range from 100 to 1200 mg KOH/g.

The polyester alcohols used together with the polyether alcohols b1) are usually prepared by condensation of polyfunctional alcohols, preferably diols, having from 2 to 12 carbon atoms, preferably from 2 to 6 carbon atoms, with polyfunctional carboxylic acids having from 2 to 12 carbon atoms, for example succinic acid, glutaric acid, adipic acid, suberic acid, azelaic acid, sebacic acid, decanedicarboxylic acid, maleic acid, fumaric acid and preferably phthalic acid, isophthalic acid, terephthalic acid and the isomeric naphthalenedicarboxylic acids.

The polyether alcohols used together with the polyether alcohols bi) used according to the invention usually have a functionality in the range from 2 to 8, in particular from 3 to 8.

In particular, polyether alcohols prepared by known methods, for example by anionic polymerization of alkylene oxides in the presence of catalysts, preferably alkali metal hydroxides or amines, are used in addition to the polyether alcohols b1).

As alkylene oxides, use is usually made of ethylene oxide, propylene oxide and/or butylene oxide, preferably ethylene oxide and/or butylene oxide and in particular pure 1,2-propylene oxide.

Starter molecules used are, in particular, compounds having at least 2, preferably from 3 to 8, hydroxyl groups or having at least two primary amino groups in the molecule.

As starter molecules having at least 2, preferably from 3 to 8, hydroxyl groups in the molecule, preference is given to using trimethylolpropane, glycerol, pentaerythritol, castor oil, sugar compounds such as glucose, sorbitol, mannitol and sucrose, polyhydric phenols, resols such as oligomeric condensation products of phenol and formaldehyde, and Mannich condensates of phenols, formaldehydes and dialkanolamines, and also melamine. The starter substances can be used individually or in the form of mixtures.

The polyether alcohols have a functionality of preferably from 3 to 8 and hydroxyl numbers of preferably from 100 mg KOH/g to 1200 mg KOH/g and in particular from 120 mg KOH/g to 570 mg KOH/g.

The use of bifunctional polyols, for example polyethylene glycols and/or polypropylene glycols, having a molecular weight in the range from 500 to 1500 in the polyol component enables the viscosity of the polyol component to be adjusted.

The proportion of polyether alcohols b1) in the component b) is preferably at least 5% by weight, particularly preferably at least 10% by weight, in particular at least 20% by weight, and not more than 60% by weight, preferably not more than 40% by weight and in particular not more than 30% by weight.

In a preferred embodiment of the process of the invention, the component b) comprises a polyether alcohol b2) having a hydroxyl number in the range from 350 to 600 mg KOH/g and a functionality in the range from 4 to 8 in addition to the polyether alcohol b1). The polyether alcohol b2) is preferably prepared by addition of propylene oxide onto a starter substance comprising at least one sugar. As sugar, preference is given to using sucrose and/or sorbitol, preferably sucrose. The starter substance usually additionally comprises at least one alcohol which is liquid at room temperature, preferably an alcohol selected from the group consisting of ethylene glycol, propylene glycol and glycerol, in particular glycerol. The preparation of the polyether alcohol b2) is usually carried out in the presence of a basic catalyst, usually an alkali metal hydroxide, or an amine. In a preferred embodiment of the invention, an amine as described above in the group b1b) is used as catalyst. When a polyether alcohol b2) is used, it is preferably present in an amount of 50-60% by weight, based on the component b).

In a further preferred embodiment of the process of the invention, the component b) comprises a polyether alcohol b3) having a functionality of from 2 to 3 and a hydroxyl number in the range from 100 to 300 mg KOH/g. The polyether alcohol b3) is preferably prepared by addition of alkylene oxides onto diols such as ethylene glycol, diethylene glycol, propylene glycol, dipropylene glycol and/or onto glycerol, trimethylolpropane or TDA. When a polyether alcohol b3) is used, it is preferably present in an amount of from 10 to 30% by weight, based on the component b).

In a particularly preferred embodiment of the invention, the component b) comprises at least one polyether alcohol b2) and at least one polyether alcohol b3) in the amounts indicated above in addition to the polyether alcohol b1).

In a further preferred embodiment of the process of the invention, the component b) comprises at least one polyester alcohol b4). This preferably has a hydroxyl number in the range from 200 to 350 mg KOH/g and a functionality of from 2 to 3. The polyester alcohol b4) is preferably prepared using aromatic carboxylic acids such as phthalic acid, terephthalic acid or phthalic anhydride. In an embodiment of the process of the invention, the polyester alcohol b4) is prepared using polyalkylene terephthalates. The polyester alcohol b4) is preferably used in an amount of from 20 to 40% by weight, based on the component b).

The component b) usually comprises the polyether alcohols b2) and/or b3) or at least one polyester alcohol b4) in addition to the polyether alcohol b1).

The compounds b) having at least two hydrogen atoms which are reactive toward isocyanate also include the chain extenders and crosslinkers which may be concomitantly used. The rigid polyurethane foams can be produced with or without concomitant use of chain extenders and/or crosslinkers. The addition of bifunctional chain extenders, trifunctional and higher-functionality crosslinkers or, if appropriate, mixtures thereof can prove to be advantageous for modifying the mechanical properties. As chain extenders and/or crosslinkers, preference is given to using alkanolamines and in particular diols and/or triols having molecular weights of less than 400, preferably from 60 to 300.

Chain extenders, crosslinkers or mixtures thereof are advantageously used in an amount of from 1 to 20% by weight, preferably from 2 to 5% by weight, based on the polyol component.

In an embodiment of the invention, propylene carbonate is used, in particular in an amount of from 0 to 3 parts by weight, based on the component b). A description of this class of compounds may be found, for example, in WO 9502620. In this way, it is possible, inter alia, to adjust the viscosity of the component b).

The production of the polyurethane foams is usually carried out in the presence of blowing agents c). Here, a distinction is made between chemical blowing agents which react with at least one of the starting components, preferably the polyisocyanate a), to liberate the blowing gas, and physical blowing agents which are inert toward the starting components for polyurethane production.

As chemical blowing agent, preference is given to using water which reacts with isocyanate groups to eliminate carbon dioxide. A further frequently used physical blowing agent is formic acid.

In combination with or in place of chemical blowing agents, physical blowing agents can also be used. These are, as described, compounds which are inert toward the starting components and are usually liquid at room temperature and vaporize under the conditions of the urethane reaction. The boiling point of these compounds is preferably below 50° C. The physical blowing agents also include compounds which are gaseous at room temperature and are introduced under pressure into the starting components or are dissolved therein, for example carbon dioxide, low-boiling alkanes and fluoroalkanes.

The physical blowing agents are usually selected from the group consisting of alkanes and cycloalkanes having at least 4 carbon atoms, dialkyl ethers, esters, ketones, acetals, fluoroalkanes having from 1 to 8 carbon atoms and tetraalkylsilanes having from 1 to 3 carbon atoms in the alkyl chain, in particular tetramethylsilane.

In a preferred embodiment of the invention, the blowing agents are hydrocarbons. The blowing agents are particularly preferably selected from the group consisting of alkane and cycloalkanes having at least 4 carbon atoms. In particular, pentanes, preferably isopentane and cyclopentane, are used. When the rigid foams are used as insulation in refrigeration appliances, cyclopentane is preferred. The hydrocarbons can be used in admixture with water.

Examples which may be mentioned are propane, n-butane, isobutane and cyclobutane, n-pentane, isopentane and cyclopentane, cyclohexane, dimethyl ether, methyl ethyl ether, methyl butyl ether, methyl formate, acetone and also fluoroalkanes which are degraded in the troposphere and therefore do not damage the ozone layer, e.g. trifluoromethane, difluoromethane, 1,1,1,3,3-pentafluorobutane, 1,1,1,3,3-pentafluoropropane, 1,1,1,2-tetrafluoroethane, difluoroethane and 1,1,1,2,3,3,3-heptafluoropropane and also perfluoroalkanes such as $C_3F_8$, $C_4F_{10}$, $C_5F_{12}$, $C_6F_{14}$, and $C_7F_{16}$. Particular preference is given to pentanes, in particular cyclopentane. The physical blowing agents mentioned can be used either alone or in any combinations with one another.

Furthermore, hydrofluoroolefins such as 1,3,3,3-tetrafluoropropene or hydrochlorofluoroolefins such as 1-chloro-3,3,3-trifluoropropene can be used as blowing agents. Such blowing agents are described, for example, in WO 2009/048826.

When hydrocarbons are used as blowing agents, preference is given to using polyether alcohols b1), b2) and, if appropriate, b3) in the component b).

When polyester alcohols b4) are used in the component b), preference is given to using halogenated blowing agents.

The production of the polyurethanes can, if necessary, be carried out in the presence of catalysts, flame retardants and customary auxiliaries and/or additives.

As catalysts, use is made of, in particular, compounds which strongly accelerate the reaction of the isocyanate groups with the groups which are reactive toward isocyanate groups.

Such catalysts are strongly basic amines such as secondary aliphatic amines, imidazoles, amidines and also alkanolamines or organic metal compounds, in particular organic tin compounds.

When isocyanurate groups are also to be incorporated into the rigid polyurethane foam, specific catalysts are required for this purpose. As isocyanurate catalysts, use is usually made of metal carboxylates, in particular potassium acetate and solutions thereof.

The catalysts can, depending on requirements, be used either alone or in any mixtures with one another.

The process of the invention can, if necessary, be carried out in the presence of flame retardants and customary auxiliaries and/or additives.

As flame retardants, it is possible to use organic phosphoric esters and/or phosphonic esters. Preference is given to using compounds which are unreactive toward isocyanate groups. Chlorine-comprising phosphoric esters are also among the preferred compounds.

Typical representatives of this group of flame retardants are triethyl phosphate, diphenyl cresyl phosphate, tris(chloropropyl) phosphate and diethyl ethanephosphonate.

In addition, it is also possible to use bromine-comprising flame retardants. As bromine-comprising flame retardants, preference is given to using compounds which have groups which are reactive toward the isocyanate group. Such compounds are esters of tetrabromophthalic acid with aliphatic diols and alkoxylation products of dibromobutenediol. Compounds derived from the group of brominated neopentyl compounds comprising OH groups can also be employed.

As auxiliaries and/or additives, use is made of the materials known per se for this purpose, for example surface-active substances, foam stabilizers, cell regulators, fillers, pigments, dyes, flame retardants, hydrolysis inhibitors, antistatics, fungistatic and bacteriostatic agents.

Further details regarding the starting compounds used may be found, for example, in Kunststoffhandbuch, volume 7 "Polyurethane", edited by Günter Oertel, Carl-Hanser-Verlag Munich, 3rd edition, 1993.

The invention is illustrated by the following examples.
Methods:
Viscosity Determination:

The viscosity of the polyols was, unless indicated otherwise, determined at 25° C. in accordance with DIN EN ISO 3219 by means of a Rheotec RC 20 rotational viscometer using the spindle CC 25 DIN (spindle diameter: 12.5 mm; internal diameter of the measuring cylinder: 13.56 mm) at a shear rate of 50 1/s Measurement of the Hydroxyl Number:

The hydroxyl numbers were determined in accordance with DIN 53240.

Thermal Conductivity:

The thermal conductivity was determined using a heat flow measurement plate instrument Hesto A50 at an average temperature of 23° C. To produce the test specimens, the polyurethane reaction mixture was introduced into a mold having the dimensions 2000×200×50 mm (15% overfilling) and removed from the mold after 5 minutes. After storage for 24 hours under standard conditions of temperature and humidity, a plurality of foam cuboids (positions 10, 900 and 1700 mm based on the start of the lance) having dimensions of 200×200×50 mm were cut from the middle. The upper side and underside were subsequently removed so that test specimens having dimensions of 200×200×30 mm were obtained.

Compressive Strength:

The compressive strength was determined in accordance with DIN 53421/DIN EN ISO 604.

Determination of the Pentane Solubility:

To determine the pentane solubility, the polyol component is mixed with the amount of blowing agent indicated in the examples (Vollrath stirrer, 1500 revolutions per minute, 2 minutes stirring time) and introduced into a screw-cap bottle, and the bottle is closed. After all gas bubbles have escaped, the clarity of the sample is firstly checked at room temperature. If the sample is clear, it is subsequently cooled in steps of 1° C. in a waterbath and checked for clarity 30 minutes after the set temperature has been reached.

Determination of the Demolding Behavior:

The demolding behavior was determined by measuring the post-expansion of foam bodies produced using a box mold having the dimensions 700×400×90 mm as a function of the demolding time and the overpacking (0, corresponds to the ratio of overall foam density/minimum fill density). The post-expansion was determined by measuring the height of the foam cuboids after 24 hours.

Preparation of the Polyether Alcohols:

Polyol 1:

A 30 l pressure reactor provided with stirrer, jacket heating and cooling, metering facilities for solid and liquid substances and alkylene oxides and also facilities for making inert with nitrogen and a vacuum system was heated to 80° C. and made inert a number of times. 5.47 kg of vic-toluenediamine were introduced into the reactor and the stirrer was started. The temperature was subsequently increased to 138° C. and a mixture of 3.61 kg of ethylene oxide and 2.77 kg of propylene oxide (2.9 mol of alkylene oxide per mole of TDA) was introduced. After a reaction time of 2 hours, the temperature was reduced to 100° C. and 88 g of 48% strength aqueous KOH were added. The temperature was increased to 138° C. and the intermediate was reacted with a further 12.26 kg of propylene oxide. The after-reaction proceeded for 2 hours at 138° C. The mixture was stripped with nitrogen for 20 minutes. 2.5% of water was subsequently added and the mixture was neutralized with phosphoric acid. The water was stripped out under reduced pressure and the product was filtered at 80° C. This gave 22.9 kg of product having the following properties:

| Hydroxyl number | 396 mg KOH/g |
|---|---|
| Viscosity (25° C.) | 13772 mPas |

Polyol 2:

The reactor described in example 1 was heated to 80° C. and made inert a number of times. 5.65 kg of vic-toluenediamine were introduced into the reactor and the stirrer was started. The temperature was subsequently increased to 138° C. and 7.50 kg of propylene oxide (2.8 mol of propylene oxide per mol of TDA) were introduced. After a reaction time of 2 hours, the temperature was reduced to 100° C. and 91 g of 48% strength aqueous KOH were added. The temperature was increased to 138° C. and the intermediate was reacted with a further 11.74 kg of propylene oxide. The after-reaction proceeded for 2 hours at 138° C. The mixture was stripped with nitrogen for 20 minutes. 2.5% of water was subsequently added and the mixture was neutralized with phosphoric acid. The water was stripped out under reduced pressure and the product was filtered at 80° C. This gave 22.7 kg of product having the following properties:

| Hydroxyl number | 371 mg KOH/g |
|---|---|
| Viscosity (25° C.) | 42359 mPas |

Polyol 3:

The reactor described in example 1 was heated to 80° C. and made inert a number of times. 6.2 kg of vic-toluenediamine were introduced into the reactor and the stirred was started. The temperature was subsequently increased to 138° C. and 8.26 kg of propylene oxide (2.8 mol of propylene oxide per mol of TDA) were introduced. After a reaction time of 2 hours, the temperature was reduced to 100° C. and 220 g of dimethylethanolamine were added. The temperature was increased to 95° C. and the intermediate was reacted with a further 12.07 kg of propylene oxide. The after-reaction proceeded for 2 hours at 95° C. The mixture was stripped by means of nitrogen for 20 minutes. This gave 23.6 kg of product having the following properties:

| Hydroxyl nymber | 404 mg KOH/g |
|---|---|
| Viscosity (25° C.) | 14600 mPas |

TABLE 1

Comparison of the viscosities of polyols based on TDA

| | OH number [mg KOH/g] | Viscosity [mPas@25° C.] |
|---|---|---|
| Polyol 1 | 396 | 13772 |
| Polyol 2 | 371 | 42359 |
| Polyol 3 | 401 | 14600 |

A comparison of the polyol viscosities obtained shows that polyol 3 according to the invention has, despite a higher OH number, a significantly lower viscosity than polyol 2 which is not according to the invention and has been prepared by means of KOH catalysis. The viscosity is of the same order of magnitude as that obtained for the polyol 1 which is not according to the invention and has corresponding proportions of ethylene oxide units.

Production of the Rigid Polyurethane Foams:

Starting Materials:

Polyol 1: from example 1
Polyol 2: from example 2
Polyol 3: from example 3
Polyol 4: polyetherol based on sucrose, glycerol and propylene oxide, KOH-catalyzed, functionality=5.1, hydroxyl number=450 mg KOH/g
Polyol 5: polyetherol based on vic-TDA, ethylene oxide and propylene oxide, hydroxyl number=160 mg KOH/g, KOH-catalyzed
Polyol 6: dipropylene glycol
Stabilizer: Tegostab B 8491 (silicone stabilizer from Evonik)
Catalyst 1: dimethylcyclohexylamine (DMCHA)
Catalyst 2: pentamethyldiethylenetriamine (PMDETA)
Catalyst 3: Lupragen N600 (BASF)
Isocyanate: polymeric MDI (Lupranat® M20)

Machine Foaming:

A polyol component was produced from the raw materials indicated. The polyol component was mixed with the amount of the indicated isocyanate required to achieve an isocyanate index of 110 by means of a high-pressure Puromat® PU 30/80 IQ (Elastogran GmbH) at a discharge rate of 250 g/sec. The reaction mixture was injected into temperature-controlled molds having dimensions of 2000 mm×200 mm×50 mm or 400 mm×700 mm×90 mm and allowed to foam there. The overpacking was 15%.

The starting materials used, the production properties and the mechanical properties of the foams are shown in table 2.

TABLE 2

Overview of machine experiments

|  | 1 (C) | 2 |
|---|---|---|
| Polyol component [pbw] | | |
| Polyol 1 | 22 | — |
| Polyol 3 | — | 22 |
| Polyol 4 | 54 | 54 |
| Polyol 5 | 15 | 15 |
| Polyol 6 | 2 | 2 |
| Stabilizer | 2.8 | 2.8 |
| Catalyst 1 | 0.5 | 0.5 |
| Catalyst 2 | 0.8 | 0.8 |
| Catalyst 3 | 0.4 | 0.4 |
| Water | 2.6 | 2.6 |
| Cyclopentane | 13 | 13 |
| Isocyanate Component | | |
| Lupranet ® M 20 | 156 | 156 |
| Cream time [s] | 5 | 5 |
| Fiber time [s] | 40 | 41 |
| Free foam density [g/L] | 23 | 23 |
| Cloud point of polyol component [° C.] | 10 | 5 |
| Viscosity of polyol component [mPas@25° C.] | 6600 | 7400 |
| Flow factor [mPas@25° C.] | 1.3 | 1.3 |
| Lambda [mW/m*K] | 19.2 | 18.8 |
| Compressive strength [N/mm$^2$] | 0.17 | 0.17 |
| Post-expansion [%] | | |
| 3 min. | 4.9 | 3.8 |
| 4 min. | 3.4 | 2.4 |
| 5 min. | 2.3 | 1.5 |
| 7 min. | 1.0 | 0.3 |
| Overall foam density [g/L] | 35.2 | 35.9 |
| Foam density of core [g/L] | 31.7 | 32 |

(C = comparative experiment)

Example 1 is a comparative example. The system in example 2 (according to the invention) comprising a polyether alcohol based on TDA and propylene oxide using dimethylethanolamine as catalyst has significantly improved demolding properties which are reflected in a lower post-expansion. Furthermore, the compatibility with the blowing agent is improved, as reflected in a lower cloud point.

The invention claimed is:

1. A process for producing a polyurethane, the process comprising:
   reacting an aromatic amine b1a) with propylene oxide and from 0 to 10% by weight of ethylene oxide relative to a total of propylene and ethylene oxide to obtain at least one polyether alcohol b1) having at least two hydrogens reactive to isocyanate,
   wherein the reaction of the aromatic amine with propylene oxide and optional ethylene oxide is catalyzed with dimethylethanolamine or imidazole;
   an amount of the catalyst amine is from 0.1 to 2.5% by mass based on the weight of all starting components,
   the aromatic amine b1a) is selected from the group consisting of aniline, toluenediamine (TDA), methylenedianiline (MDA) and polymethylenedianiline (PMDA),
   then reacting compounds b having at least two hydrogen atoms which are reactive toward isocyanate groups, with polyisocyanates a) to yield the polyurethane;
   wherein the compounds b) having at least two hydrogen atoms which are reactive toward isocyanate groups comprise the at least one polyether alcohol b1).

2. The process according to claim 1, wherein the aromatic amine b1a) is at least one of TDA and PMDA.

3. The process according to claim 1, wherein the aromatic amine b1a) is TDA.

4. The process according to claim 3, wherein at least 90% by weight of the TDA, based on the weight of the TDA, is a vicinal TDA.

5. The process according to claim 1, wherein the catalyst amine is dimethylethanolamine.

6. The process according to claim 1, wherein the catalyst amine is imidazole.

7. The process according to claim 1, wherein an amount of the catalyst amine is from 0.1 to 1.0% by mass based on the weight of all starting components.

8. The process according to claim 1, wherein a hydroxyl number of the polyether alcohols b1) is from 200 to 800 mg KOH/g.

9. The process according to claim 1, wherein the component b) further comprises at least one compound having at least two hydrogen atoms which are reactive toward isocyanate groups which is different from the polyether alcohol b1).

10. The process according to claim 9, wherein the different component b) is at least one polyether alcohol b2) having a hydroxyl number in the range from 350 to 600 mg KOH/g and a functionality in the range from 4 to 8.

11. The process according to claim 1, wherein the component b) further comprises at least one polyether alcohol b3) having a functionality of from 2 to 3 and a hydroxyl number in the range from 100 to 300 mg KOH/g.

12. The process according to claim 1, wherein the component b) further comprises at least one polyester alcohol b4 having a hydroxyl number in the range from 200 to 350 mg KOH/g and a functionality of from 2 to 3.

13. The process according to claim 1, wherein the reaction of compounds b with the polyisocyanates is carried out in the presence of blowing agents c).

14. The process according to claim 13, wherein the blowing agents c) comprise hydrocarbons.

15. A process for producing a polyurethane foam, the process comprising:
   reacting an aromatic amine b1a) with propylene oxide and from 0 to 10% by weight of ethylene oxide relative to a total of propylene and ethylene oxide to obtain at least one polyether alcohol b1) having at least two hydrogens reactive to isocyanate,
   wherein the reaction of the aromatic amine with propylene oxide and ethylene oxide is catalyzed with dimethylethanolamine or imidazole;
   an amount of the catalyst amine is from 0.1 to 2.5% by mass based on the weight of all starting components,
   the aromatic amine b1a) is selected from the group consisting of aniline, toluenediamine (TDA), methylenedianiline (MDA) and polymethylenedianiline (PMDA),
   combining the polyether alcohol b1) with at least one polyether alcohol b2) having a hydroxyl number in the range from 350 to 600 mg KOH/g and a functionality in the range from 4 to 8 and optionally, at least one polyether alcohol b3) having a functionality of from 2 to 3 and a hydroxyl number in the range from 100 to 300 mg KOH/g to form a mixture of compounds b) having at least two hydrogen atoms which are reactive toward isocyanate groups;

then reacting the mixture of compounds b with polyisocyanates a) in the presence of blowing agent comprising a hydrocarbon to yield the foamed polyurethane.

16. The process according to claim 15, wherein
the aromatic amine b1a) is TDA,
the catalyst amine is dimethylethanolamine, and
the blowing agent comprises at least one hydrocarbon selected from the group consisting of alkanes and cycloalkanes having at least 4 carbon atoms.

17. A process for producing a polyurethane foam, the process comprising:
reacting an aromatic amine b1a) with propylene oxide and ethylene oxide in an amount not exceeding 10% by weight of a total of propylene and ethylene oxide to obtain at least one polyether alcohol b1) having at least two hydrogens reactive to isocyanate,
wherein the reaction of the aromatic amine with propylene oxide and up to 10% by weight of ethylene oxide is catalyzed with dimethylethanolamine or imidazole;
an amount of the catalyst amine is from 0.1 to 2.5% by mass based on the weight of all starting components,
the aromatic amine b1a) is selected from the group consisting of aniline, toluenediamine (TDA), methylenedianiline (MDA) and polymethylenedianiline (PMDA), preparing a compound b) mixture of compounds having at least two hydrogen atoms which are reactive toward isocyanate groups, the mixture comprising: the polyether alcohol b1); at least one polyether alcohol b2) having a hydroxyl number in the range from 350 to 600 mg KOH/g and a functionality in the range from 4 to 8; at least one polyester alcohol b4 having a hydroxyl number in the range from 200 to 350 mg KOH/g and a functionality of from 2 to 3; and optionally, at least one polyether alcohol b3) having a functionality of from 2 to 3 and a hydroxyl number in the range from 100 to 300 mg KOH/g;

then reacting the mixture of compounds b with polyisocyanates a) in the presence of blowing agent comprising a halogenated compound to yield the foamed polyurethane.

18. The process according to claim 17, wherein
the aromatic amine b1a) is TDA,
the catalyst amine is dimethylethanolamine, and
the halogenated compound comprises at least one selected from the group consisting of trifluoromethane, difluoromethane, 1,1,1,3,3-pentafluorobutane, 1,1,1,3,3-pentafluoropropane, 1,1,1,2-tetrafluoroethane, difluoroethane, 1,1,1,2,3,3,3-heptafluoropropane, perfluoroalkanes, 1,3,3,3-tetrafluoropropene and hydrochlorofluoroolefins.

* * * * *